Patented June 10, 1930

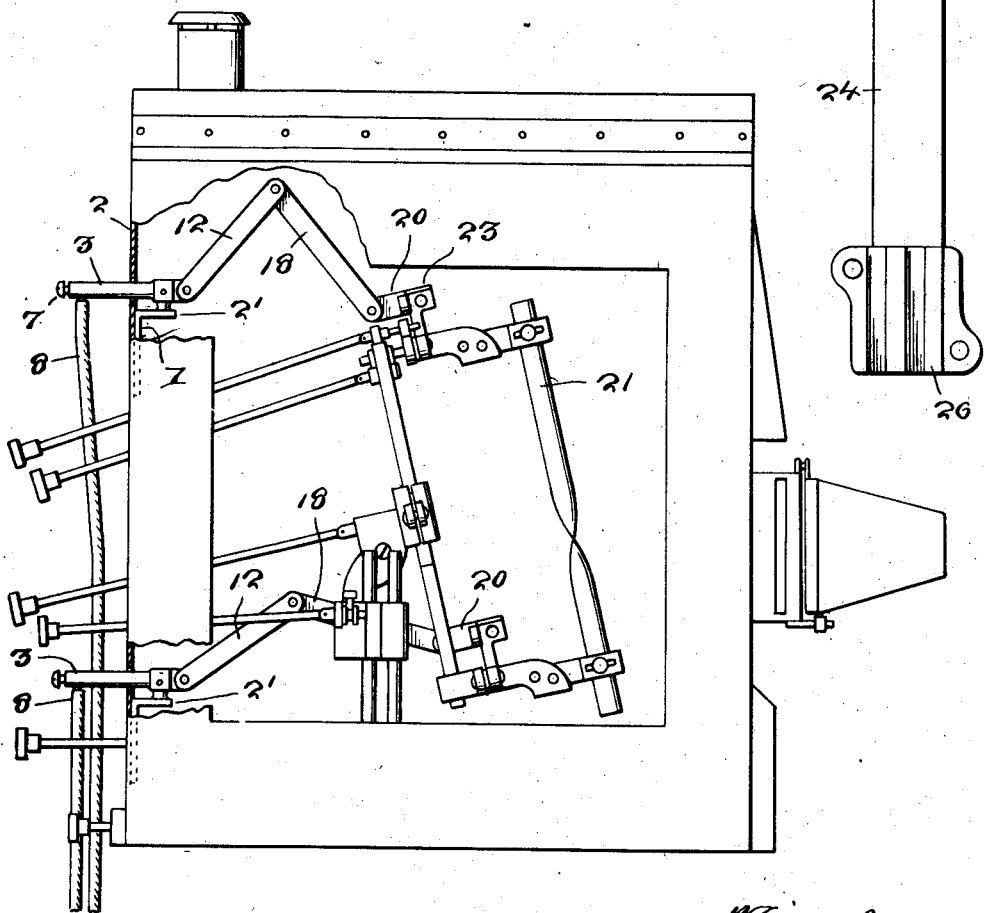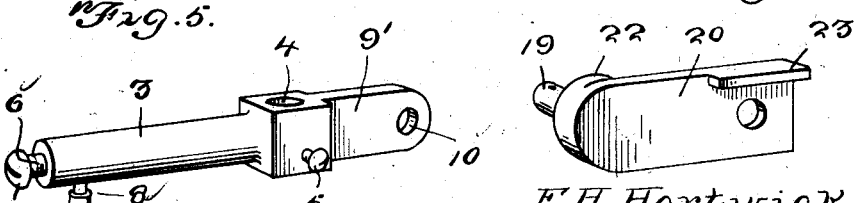

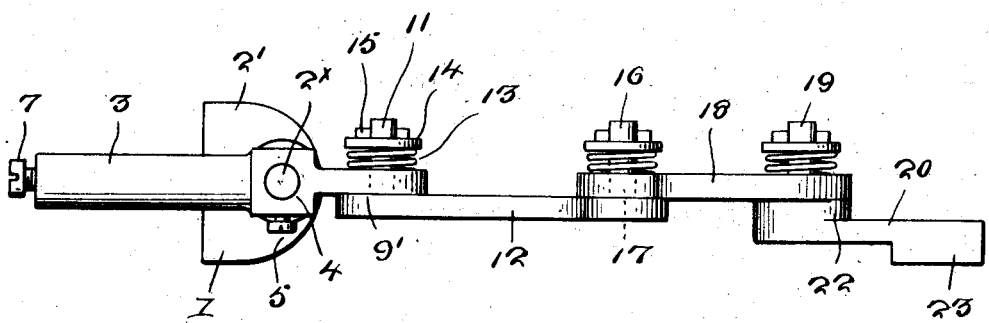
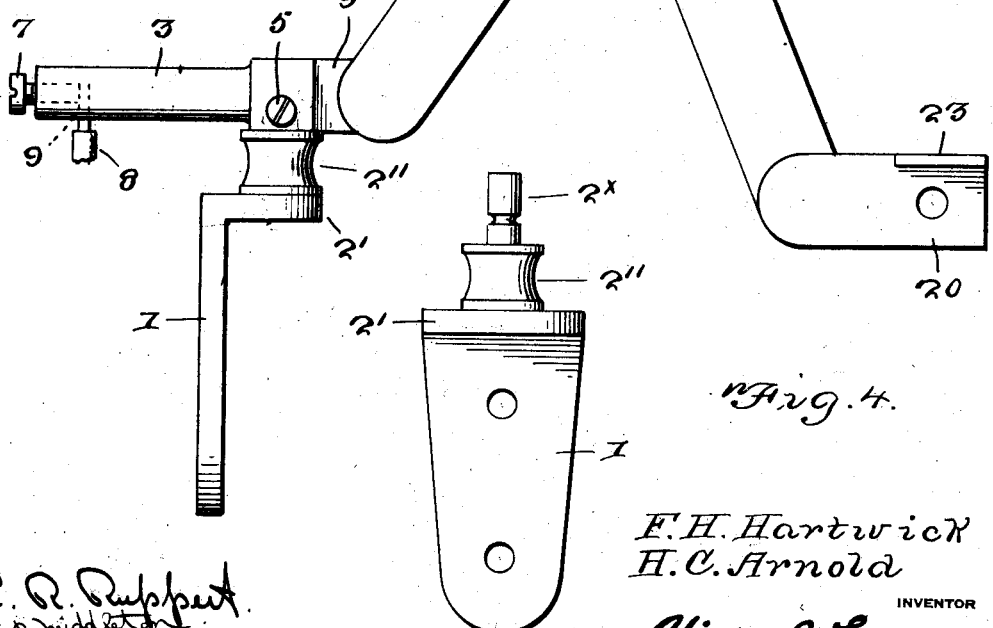

1,763,517

UNITED STATES PATENT OFFICE

FREDERICK H. HARTWICK AND HARRY C. ARNOLD, OF COLUMBUS, OHIO

PROJECTOR LAMP

Application filed January 21, 1924. Serial No. 687,552.

This invention relates to improvements in electric projector lamps, the general object of the invention being to provide flexible and adjustable supporting means for the carbon terminal so as to facilitate the adjustment of the arc for focusing.

This invention also consists in certain other features of construction and in the combination and arrangement of the several parts, to be hereinafter fully described, illustrated in the accompanying drawings and specifically pointed out in the appended claim.

In describing the invention in detail, reference will be had to the accompanying drawings wherein like characters denote like or corresponding parts throughout the several views, and in which:—

Figure 1 is a side view of the invention showing the application of the device.

Figure 2 is a plan view thereof.

Figure 3 is a side elevation.

Figure 4 is a front elevation of the brackets.

Fig. 5 is a perspective view of the bar.

Fig. 6 is a perspective view of the bracket.

Fig. 7 is a side elevation of a modified form of a bracket.

In these views 1 indicates a bracket which is adapted to be connected to a wall 2 of an arc lamp projector designed to define a spot light in projectors. This bracket is of the angle type and is provided with a horizontal part 2' which carries a boss 2" which in turn carries a grooved pin 2ˣ. A bar 3 is swiveled on the pin by having a hole 4 therein fitting over the pin, a set screw 5 being carried by the bar and engaging the groove in the pin for holding the bar on the bracket. One end of this bar is bored longitudinally, to receive the screw 7 which holds the terminal wire 8 in the hole 9 formed in the bar. The other end of the bar is flattened, as at 9', and this flattened part is provided with a hole 10 for receiving the stud 11 on the link 12. A spring 13 and washer 14 are placed on the stud, the spring engaging the washer and the flattened part 9' as best shown in Figure 2. A pin 15 passes through a hole in the stud to hold the parts in position. A stud 16 is arranged on the other end of the link for engaging one of the counter sunk holes 17 in a link 18, the other hole in the link 18 receiving the stud 19 on the securing means of the bracket 20 for supporting the holders for carbons 21. Springs and washers are arranged on the studs 16 and 19 the same as on the stud 11 so that the parts are frictionally held together though they can be moved to adjust the carbon towards and away from the bracket 1. The bracket 20 is provided with a boss 22 which carries a pin 19', said boss forming a shoulder against which a portion of the link 18 is pressed by the spring. This bracket is also provided with a flange 23. Instead of using the bracket 20 we may use the bracket 24 which is shown in Figure 7, this bracket being provided with the pin 25 to be received in the hole of the link 18 and the outer end of the bracket 24, is provided with the grooves 26 for receiving the securing means of the holders for the carbons 21.

From the foregoing it will be seen that the carbon supporting bracket can be easily and quickly adjusted towards and away from the bracket 1, the springs holding the parts in adjusted position by causing them to frictionally engage each other and offer minimum resistance while the arc may be shifted over an unusually wide range with respect to the projector lamps.

It is thought from the foregoing description that the advantages and novel features of the invention will be readily apparent.

We desire it to be understood that we may make changes in the construction and in the combination and arrangement of the several parts, provided that such changes fall within the scope of the appended claim.

What we claim is:—

In a supporting device for the carbons of an arc lamp projector, angle brackets secured to a wall of the lamp housing of the projector and including horizontal parts, a boss on each of the horizontal parts, a pin rising from each boss, a bar for each pin swiveled thereon, the bars passing through said wall and each having a horizontal bore in the outer end thereof, a screw for each bore for securing a terminal of an electric wire in a hole formed in each bar at right angles to the bores therein, the opposite ends of said bars being flattened, links, spring pressed pivot means connecting the links at one of their ends in pairs, one link of each pair having its opposite end pivoted to the flattened end of one of said bars, brackets at the opposite ends of the other links of the pairs, a boss for each of the second mentioned brackets, studs extending from the bosses and providing pivots between the links and the second mentioned brackets respectively, spring means for the last mentioned pivots, a flange for each of the second mentioned brackets disposed at the outer end thereof, carbon holders, and connecting means between the carbon holders and flanged ends of the second mentioned brackets.

In testimony whereof we affix our signatures.

FREDERICK H. HARTWICK.
HARRY C. ARNOLD.